United States Patent
Birger (10) Patent No.: US 9,749,421 B2
(45) Date of Patent: Aug. 29, 2017

(54) METHOD AND APPARATUS FOR ENABLING DELIVERY OF MEDIA CONTENT

(71) Applicant: Vonage America Inc., Holmdel, NJ (US)

(72) Inventor: Eli Birger, Petah Tikva (IL)

(73) Assignee: Vonage America Inc., Holmdel, NJ (US)

( * ) Notice: Subject to any disclaimer, the term of this patent is extended or adjusted under 35 U.S.C. 154(b) by 147 days.

(21) Appl. No.: 14/336,090

(22) Filed: Jul. 21, 2014

(65) Prior Publication Data
US 2016/0021022 A1    Jan. 21, 2016

(51) Int. Cl.
| | | |
|---|---|---|
| *G06F 15/16* | (2006.01) | |
| *G06F 15/177* | (2006.01) | |
| *G06F 15/173* | (2006.01) | |
| *H04L 29/08* | (2006.01) | |
| *H04L 29/06* | (2006.01) | |

(52) U.S. Cl.
CPC ........ *H04L 67/141* (2013.01); *H04L 65/1069* (2013.01); *H04L 65/4084* (2013.01)

(58) Field of Classification Search
CPC ..... H04L 47/801; H04L 47/805; H04L 67/22; H04L 67/36; H04L 67/141; H04L 67/325; H04L 67/2804; H04L 67/2842; H04L 29/06027; H04L 47/808; H04L 65/80; H04L 65/608; H04L 65/1006; H04L 65/1069; H04L 65/1073; H04L 65/1083; H04L 65/4084
USPC ................ 709/207, 223, 224, 225, 228, 239
See application file for complete search history.

(56) References Cited

U.S. PATENT DOCUMENTS

| | | | |
|---|---|---|---|
| 8,161,171 B2 | 4/2012 | Maes | |
| 2003/0196199 A1* | 10/2003 | Chiu | ................. H04N 7/17318 725/25 |
| 2005/0193019 A1* | 9/2005 | LeComte | ............ H04N 7/1675 |
| 2005/0262082 A1* | 11/2005 | Kushalnagar | ....... H04L 65/4084 |
| 2008/0097851 A1* | 4/2008 | Bemmel | ............... G06Q 30/02 705/14.36 |
| 2008/0158336 A1 | 7/2008 | Benson et al. | |

(Continued)

OTHER PUBLICATIONS

"Lorex Wireless Home Monitoring System. LW 2730/LW 2930 Series Manual." http://www.lorextechnology.com/downloads/wireless-home-monitors/LW2730-LW2930-Series/LW2730_LW2930_SERIES_MANUAL_EN_R2_web.pdf.

*Primary Examiner* — Farzana Huq
(74) *Attorney, Agent, or Firm* — Moser Taboada; Joseph Pagnotta (57) ABSTRACT

Methods and systems for enabling delivery of media content are provided herein. In some embodiments a method for enabling delivery of media content, comprises receiving a first message from a user device associated with a first subscriber of a telephony service provider to establish a real time communication session with a content service, wherein the first message includes a first subscriber identifier and information identifying the content to be streamed, determining that the first subscriber is authorized to access the content, and sending a second message directed to a second subscriber identifier associated with the content service to establish the real time communication session between the user device and the content service, wherein the real time communication session is established to begin streaming the content.

28 Claims, 5 Drawing Sheets

(56) References Cited

U.S. PATENT DOCUMENTS

| | | | |
|---|---|---|---|
| 2008/0207233 A1* | 8/2008 | Waytena | G06F 17/30864 455/466 |
| 2009/0133103 A1* | 5/2009 | Sathyan | H04L 63/0428 726/4 |
| 2010/0063989 A1* | 3/2010 | Mehta | H04N 21/2343 709/202 |
| 2010/0111101 A1* | 5/2010 | McKee | H04N 21/441 370/466 |
| 2011/0141280 A1 | 6/2011 | Cao et al. | |
| 2012/0017003 A1* | 1/2012 | Ge | H04L 63/08 709/231 |
| 2012/0131628 A1* | 5/2012 | Janning | H04L 29/06027 725/114 |
| 2013/0145161 A1* | 6/2013 | Pedlow | H04L 63/0435 713/168 |
| 2014/0297804 A1* | 10/2014 | Shivadas | H04L 65/602 709/219 |

* cited by examiner

METHOD AND APPARATUS FOR ENABLING DELIVERY OF MEDIA CONTENT

BACKGROUND

Field

Embodiments of the present invention relate generally to communication systems and, more particularly, to methods and systems for delivering media content in response to a request message.

Description of the Related Art

Most on-demand media content is streamed or otherwise delivered over the Internet to users in response to web uniform resource locators (URL) requests made to media servers, which respond by delivering the requested media content on the users' devices. While prevalent, the present mechanism is not particularly convenient, and in some cases, requires users to remember lengthy or complicated text strings, or navigate through a number of Web pages to find and select the content to be streamed/delivered. In several cases, the web URL requests need to be processed by a specific application, such as a browser or another media application that needs to be launched and configured which requires additional time and resources.

Instead of requesting media content using web URL, users may wish to use simpler and more familiar means for requesting media content. Users may also wish that the content be delivered on their choice of a variety of display devices available today. In some cases, the requested media content needs additional processing to be displayed appropriately according to the dimensions or other specifications of the user devices, and in several such instances, the additional processing may fail partially or completely, resulting in sub-optimal display of the media content.

Accordingly, there exists a need in the art for methods and systems that provide convenient and familiar manner for media content delivery to users.

SUMMARY

Methods and systems for enabling delivery of media content are provided herein. In some embodiments a method for enabling delivery of media content, comprises receiving a first message from a user device associated with a first subscriber of a telephony service provider to establish a real time communication session with a content service, wherein the first message includes a first subscriber identifier and information identifying the content to be streamed, determining that the first subscriber is authorized to access the content, and sending a second message directed to a second subscriber identifier associated with the content service to establish the real time communication session between the user device and the content service, wherein the real time communication session is established to begin streaming the content.

In some embodiments, a system enabling delivery of media content comprises a call processing system configured to receive a first message from a user device associate with a first subscriber of the telephony service provider to establish a real time communication session with a content server device associated with a second subscriber. The first message includes a first subscriber identifier, a second subscriber identifier, and information identifying the content to be streamed. The call processing system is configured to send a second message directed to the second subscriber identifier to establish the real time communication session between the user device and the content server device, wherein the real time communication session is established to begin streaming the content.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention relate generally to improved methods and systems for enabling delivery of multimedia content. In some embodiments, a telephony service subscriber may call a content provider to initiate a broadcast of media content. The telephony service provider that provides the telephony service may facilitate (a) the establishment of the call between the subscriber and the content provider to enable the streaming of media content, (b) subscriber authentication, (c) subscriber billing, and the like. This advantageously alleviates the need for the content provider to perform these functions. In some embodiments, the subscriber may send a text message (e.g., a short message service (SMS) message) to the content provider to initiate a broadcast of media content instead of calling the content provider.

For example, in some embodiments, a first subscriber of a telephony service provider (e.g., a Voice over Internet Protocol (VoIP) telephony service provider) may send a first message directed to a second subscriber (e.g., a content provider), requesting content. The content requested may be streamed from a content server device associated with the content provider to a user device associated with the first subscriber. If the first subscriber called the content provider, the first message may be a session initiation protocol (SIP) message, or other type of telephony signaling message that may be used to establish a VoIP call, a packet switched telephone network (PSTN) call, or a cellular phone network call. In embodiments where the subscriber sends a text message to the content provider to initiate a broadcast of content, the first message may be an SMS or Multimedia Messaging Service (MMS) message. Although SIP, SMS and MMS messages are described above, messages/data packets from any Transmission Control Protocol (TCP) or User Datagram Protocol (UDP) based protocol, or proprietary protocol, may be used with embodiments described herein.

In any of the embodiments described above, the first message may include information that uniquely identifies the first subscriber, the content provider and the requested content. In some embodiments, the first message may also uniquely identify at least one of the user device or an application to which the content is to be streamed. The telephony service provider automatically determines, based on profile of the first subscriber and properties of the content, whether the first subscriber is authorized to access the content requested by the first subscriber. If the first subscriber is authorized to access the content, the telephony system sends a second message directing the content provider to stream content to the first subscriber, for example, on the user device. In some embodiments, the second message is also a SIP message.

In response to receiving the second message, the content provider streams content from the content server device to the user device over a real time communication session. In some embodiments, the telephony service provider system monitors the content accessed by the first subscriber and charges the first subscriber for accessing the content from the content provider, for example, by debiting a monetary account associated with the first subscriber. In some embodiments, the telephony service provider system may also provide payment to, or otherwise credit, the content provider for providing the content to the first subscriber, for example by crediting a monetary account associated with the content provider.

Some portions of the detailed description that follow are presented in terms of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

Figure 1:
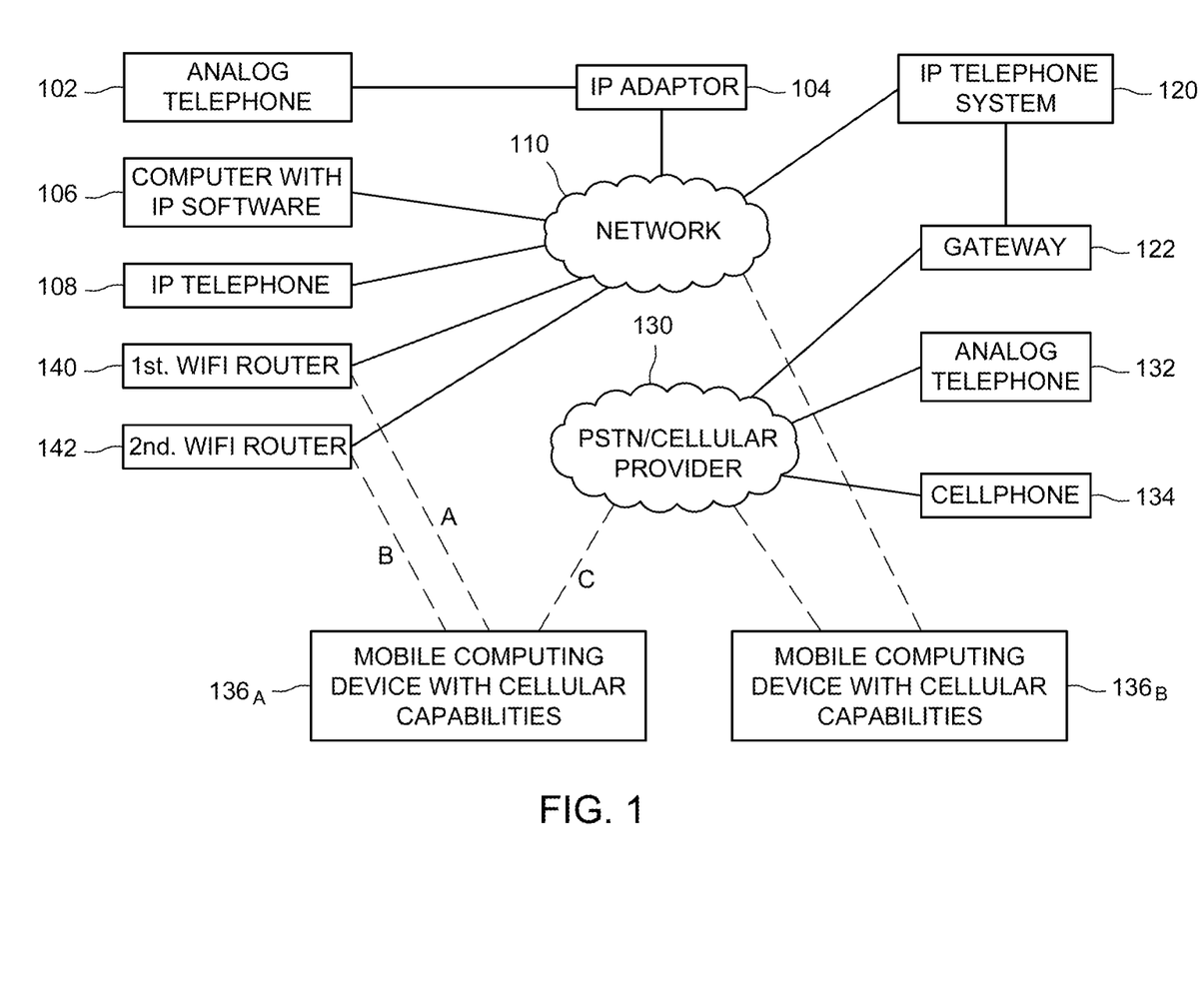
FIG. 1 depicts a block diagram of a telecommunication network, according to one or more embodiments of the invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers (or "users", or "subscribers") of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102, which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device that is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities 136$_A$ (e.g., a smartphone) is capable of establishing a first wireless data connection A with a first wireless access point 140, such as a WiFi or WiMax router. The first wireless access point 140 is coupled to the Internet 110. Thus, the mobile computing device 136$_A$ can establish a VOIP telephone call with the IP telephony system 120 via a path through the Internet 110 and the first wireless access point 140.

FIG. 1 also illustrates that the mobile computing device 136$_A$ can establish a second wireless data connection B with a second wireless access point 142 that is also coupled to the Internet 110. Further, the mobile computing device 136$_A$ can establish either a third wireless data connection C via a packet-switch network provided by a cellular service provider 130 using its cellular telephone capabilities, or establish a voice based session telephone call via a circuit-switched network provided by a cellular service provider 130. The mobile computing device 136$_A$ could also establish a VoIP telephone call with the IP telephony system 120 via the second wireless connection B or the third wireless connection C.

Although not illustrated in FIG. 1, the mobile computing device 136$_A$ may be capable of establishing a wireless data connection to a data network, such as the Internet 110, via alternate means. For example, the mobile computing device 136$_A$ might link to some other type of wireless interface using an alternate communication protocol, such as the WIMAX standard.

Similarly, mobile computing device with cellular capabilities 136$_B$ may also be coupled to internet 110 and/or cellular service provider 130. In some embodiments, mobile computing device 136$_B$ may be connected to internet 110 via a WIFI or WIMAX connection, and the like, and can also establish a VOIP telephone calls with the IP telephony system 120 similar to mobile computing device 136$_A$. In embodiments of the present invention, communications environment 100 may be used to establish voice based or data based telecommunications sessions between mobile computing device 136$_A$ and mobile computing device 136$_B$, depending on various criteria associated with each of the mobile computing devices, as will be described below in more detail.

Figure 2:
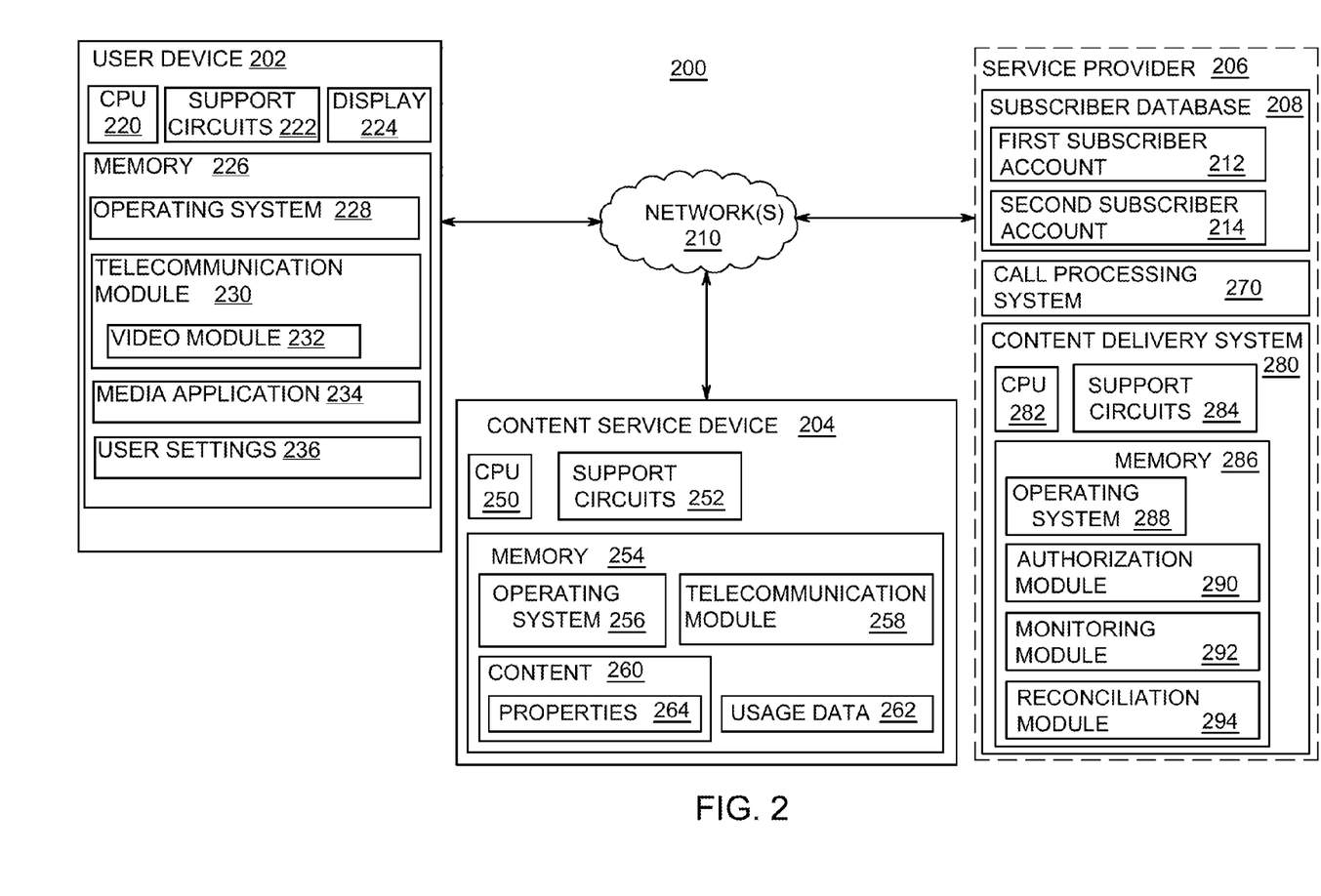
FIG. 2 depicts a block diagram of a system for enabling delivery of media content, according to one or more embodiments.

FIG. 2 depicts a block diagram of a system 200 for enabling delivery of media content, in accordance with embodiments presented herein. The system 200 includes at least one telecommunication service provider system 206 that provides telecommunication services to a plurality of end-user devices (e.g., such as user device 202) via one or more networks 210. Devices 202 and 204 may include analog phone 102, a computer with IP software 106, IP telephone 108, and/or mobile computing device with cellular capabilities 136A, 136B, one or more networked content servers, and the like, as shown in FIG. 1. The telecommunication service provider system 206 may be an IP telephone system 120 or a PSTN/cellular provider 130 as described with respect to FIG. 1.

The user device 202 comprises a Central Processing Unit (CPU) 220, support circuits 222, display device 224, and a memory 226. The CPU 220 may comprise one or more commercially available microprocessors or microcontrollers that facilitate data processing and storage. The various support circuits 222 facilitate the operation of the CPU 220 and include one or more clock circuits, power supplies, cache, input/output circuits, and the like. The memory 226 comprises at least one of Read Only Memory (ROM), Random Access Memory (RAM), disk drive storage, optical storage, removable storage and/or the like. In some embodiments, the memory 226 comprises an operating system 228, telecommunication module 230, media application 234, and user settings 236.

The operating system (OS) 228 generally manages various computer resources (e.g., network resources, file processors, and/or the like). The operating system 228 is configured to execute operations on one or more hardware and/or software modules, such as Network Interface Cards (NICs), hard disks, virtualization layers, firewalls and/or the like. Examples of the operating system 228 may include, but are not limited to, LINUX, MAC OSX, BSD, UNIX, MICROSOFT WINDOWS, 10S, ANDROID and the like.

The telecommunication module 230 may be any telecommunication application that facilitates voice calls, video calls, SMS and MMS messaging, and the like. The telecommunication module 230 also handles associated processes during a call, including, but not limited to, generating, sending or interpreting Dual-tone multi frequency (DTMF) signaling tones, handling call waiting, call conferencing, video insertion, video reception and transmission, and the like. In some embodiments, the telecommunication module 230 may be a mobile Voice over Internet protocol (VoIP) telephony app, or other type of over-the-top (OTT) communications app, disposed on user device 202.

In some embodiments, the telecommunication module 230 may include a video module 232 to handle processing of all video related processes during a call, including video calls and displaying streaming video content provided by a content provider to user device 202. The video module 232 assists the telecommunication module 230 during a call for video related processing. The video module 232 provides storage for incoming or outgoing video data, processes or transcodes video data, and renders video data, for example, on the display 224.

The media application 234 may be any other application that can play audio/video content on the user device 202. The media application 234 has a unique identifier that may include one or more of an application ID, or a physical ID, e.g. a MAC address, of the user device 202. The media application 234 is configured to connect to specific network locations, for example, media content storage locations, and to download or stream media content for display on the user device 202. In some embodiments, the media application 234 also helps schedule display of media content on the user device 202. In some embodiments, the media application 234 may similar to a NETFLIX® or XFINITY® ON DEMAND application capable displaying media content, e.g., a video.

User settings 236 include user preferences associated with calls, contacts, video display, and other usage based preferences for the user device 202. In some embodiments, the user settings 236 also include user details, such as a subscriber ID that uniquely identifies the user on a telecommunications network, for example, an IP telephony system, a PSTN network or a cellular phone network.

The content service device 204 comprises a Central Processing Unit (CPU) 250, support circuits 252, and a memory 254. Although schematically depicted as a single computer system for clarity, it should be understood that the content service device 204 may include one or more networked computer systems. The CPU 250 may comprise one or more commercially available microprocessors or microcontrollers that facilitate data processing and storage. The various support circuits 252 facilitate the operation of the CPU 250 and include one or more clock circuits, power supplies, cache, input/output circuits, and the like. The memory 254 comprises at least one of Read Only Memory (ROM), Random Access Memory (RAM), disk drive storage, optical storage, removable storage and/or the like. In some embodiments, the memory 254 comprises an operating system 256, telecommunication module 258, content 260, and usage data 262.

The operating system (OS) 256 generally manages various computer resources (e.g., network resources, file processors, and/or the like). The operating system 256 is configured to execute operations on one or more hardware and/or software modules, such as Network Interface Cards (NICs), hard disks, virtualization layers, firewalls and/or the like. Examples of the operating system 256 may include, but are not limited to, LINUX, MAC OSX, BSD, UNIX, MICROSOFT WINDOWS, 10S, ANDROID and the like.

The telecommunication module 258 may be any telecommunication application that facilitates voice calls, video calls, SMS and MMS messaging, and the like. The telecommunication module 258 also handles associated processes during a call, including, but not limited to, generating, sending or interpreting Dual-tone multi frequency (DTMF) signaling tones, handling call waiting, call conferencing, video insertion, video reception and transmission, and the like. In some embodiments, the telecommunication module 258 may be a mobile Internet protocol (IP) app, or other type of over-the-top (OTT) communications app, disposed on content server device 204.

The content 260 includes media content for transmission by the content server device 204 to the user device 202. For example, the telecommunication module 258 of the content server device 204 streams the content 260 to the telecommunications module 230 of the user device 202 through the network(s) 210, according to any of the several communication protocols generally known in the art. According to some embodiments, the content 260 is streamed utilizing a real time communication session, including but not limited to, a real-time transport protocol (RTP) session, a secured or unsecured HTTP session, a secured or unsecured FTP session, or other session protocols as known in the art. The content 260 streamed to the user device 202 is displayed on the display 224 by telecommunication module 230 and the video module 232. The content 260 includes content properties 264 that specify various preferences related to viewership or consumption of the content 260. For example, properties 264 include, without limitation, content identifier, information on age rating, genre, target audience, content pricing, among others. The properties 264 may be defined by one or more of the content creator or publisher, the content provider, e.g. the second subscriber, the IP telephony service, among others.

The usage data 262 includes information about the consumption of the content 260, for example, display of the content 260 on the user device 202. The usage data 262 includes, without limitation, one or more of duration for which the content 260 is displayed, number of times the content 260 is accessed, number of views (for pay-per-view type usage determination) of portions of the content 260, user operations while the content 260 is displayed, e.g., pause, slow motion, fast forward, rewind and the like, among several other content usage related information.

The telecommunication service provider network 206 may include a subscriber database, a call processing system 270, and a content delivery system 280. The subscriber database 208 includes subscriber information, including but not limited to, subscriber details such as subscriber name, age, address, subscriber device(s) information including MAC addresses of devices associated with subscribers, reserved IP addresses, device specific content preferences, subscriber payment details such as subscriber account information, auto-debit and auto-credit information, account balance, among other subscriber related information. The subscriber database 208 includes a first subscriber account 212 and a content provider account (i.e., second subscriber account 214). In a VoIP network, a call request oftentimes takes the form of a Session Initiation Protocol (SIP) INVITE message sent from the user device 202 to the call processing system 270. In a VoIP network, the call processing system 270 may be, for example, a SIP Proxy Network. The details and functionality of SIP can be found in the Internet Engineering Task Force (IETF) Request for Comments (RFC) Paper No. 3261 entitled, "SIP: Session Initiation Protocol" herein incorporated in its entirety by reference. The call processing system 270 attempts to establish a voice or a video connection between the user device 202 and the content server device 204. To accomplish this, in some embodiments, the call processing system 270 (e.g., an SIP Proxy Network) may receive a SIP INVITE message from the user device 202 directed to the content server device 204, and the call processing system sends a SIP INVITE message to the content server device 204. According to some embodiments, the call processing system 270 is configured to receive a request from the first subscriber in the form of one or more of a text message, e.g. a short message service (SMS) message, and other similar such messages. The call processing system 270 retrieves information from the received text message, e.g. information uniquely identifying the requested content, the first subscriber, the content provider, the user device on which the content is to be streamed, an application that is to be invoked at the user device for displaying the content, a time for streaming the content, and the like.

In some embodiments, the content delivery system 280 comprises a Central Processing Unit (CPU) 282, support circuits 284, and memory 286. The CPU 282 may comprise one or more commercially available microprocessors or microcontrollers that facilitate data processing and storage. The various support circuits 284 facilitate the operation of the CPU 282 and include one or more clock circuits, power supplies, cache, input/output circuits, and the like. The memory 286 comprises at least one of Read Only Memory (ROM), Random Access Memory (RAM), disk drive storage, optical storage, removable storage and/or the like. In some embodiments, the memory 286 comprises an operating system 288, authorization module 290, monitoring module 292, and a reconciliation module 294. In some embodiments, the components of the content delivery system 280 (i.e., authorization module 290, monitoring module 292, and a reconciliation module 294) may be disposed on a single server. In other embodiments, the authorization module 290, the monitoring module 292, and the reconciliation module 294 may each be separate servers communicatively coupled to each other. In some embodiments, the authorization module 290, the monitoring module 292, and the reconciliation module 294 may be co-located or may be distributed cloud based services maintained by different entities.

The OS 288 generally manages various computer resources (e.g., network resources, file processors, and/or the like). The operating system 288 is configured to execute operations on one or more hardware and/or software modules, such as Network Interface Cards (NICs), hard disks, virtualization layers, firewalls and/or the like. Examples of the operating system 288 may include, but are not limited to, LINUX, MAC OSX, BSD, UNIX, MICROSOFT WINDOWS, 10S, ANDROID and the like.

The authorization module 290 determines if a subscriber, e.g. the first subscriber, is authorized to view/access particular content, e.g., the content 260. In some embodiments, the authorization module 290 compares information about the first subscriber which may be obtained from the subscriber database 208, to the properties of the content requested by the first subscriber, e.g., the content 260 properties 264. In some embodiments, if the first subscriber's age exceeds the minimum age rating associated with the content 260, the first subscriber is considered authorized to view or consume the content 260. Similarly, if the first subscriber is younger than the minimum age rating associated with the content 260, the first subscriber is not authorized to view or consume the content 260. In some embodiments, if the account balance of the first subscriber is less than the estimated cost of delivering/providing the content 260 to the first subscriber, the first subscriber is not authorized to view or consume the content 260. If the authorization module 290 determines that the first subscriber is authorized to view the content 260 requested by the first subscriber, the call processing system 270 processes the request of the first subscriber for the content 260, by sending a message to the content provider for requesting the content 260.

The monitoring module 292 monitors the content 260 streamed to the user device 202 from the content server device 204. The monitoring module 292 monitors or otherwise captures one or more of duration for which the content 260 is displayed on the user device 202, number of times the content 260 is accessed or played on the user device 202, number of views (for pay-per-view type usage determination) of portions of the content 260 on the user device 202, user operations while the content 260 is displayed on the user device 202, e.g., pause, slow motion, fast forward, rewind and the like, forwarding the content identifier to another subscriber, among several other content usage related information. In some embodiments, the monitoring module 292 receives the monitoring information from the usage data 262 of the content server device 204.

The reconciliation module 294 assesses the amount to be charged to the first subscriber for the content accessed by the first subscriber. In some embodiments, the reconciliation module 294 also assesses the amount to be paid to the content provider for providing the content for access by the first subscriber. The billing schemes for the first subscriber and the payment schemes for the content provider may be the same or may be different. Some billing schemes may include, but are not limited to, fixed price per content access, time based pricing (i.e., cost proportional to the duration for which the content is accessed), data usage pricing, and the like.

The networks 210 comprise one or more communication systems that connect computers by wire, cable, fiber optic and/or wireless link facilitated by various types of well-known network elements, such as hubs, switches, routers, and the like. The networks 210 may include an Internet Protocol (IP) network 110, a public switched telephone network (PSTN) 130, or other mobile communication networks, and may employ various well-known protocols to communicate information amongst the network resources.

Figure 3:
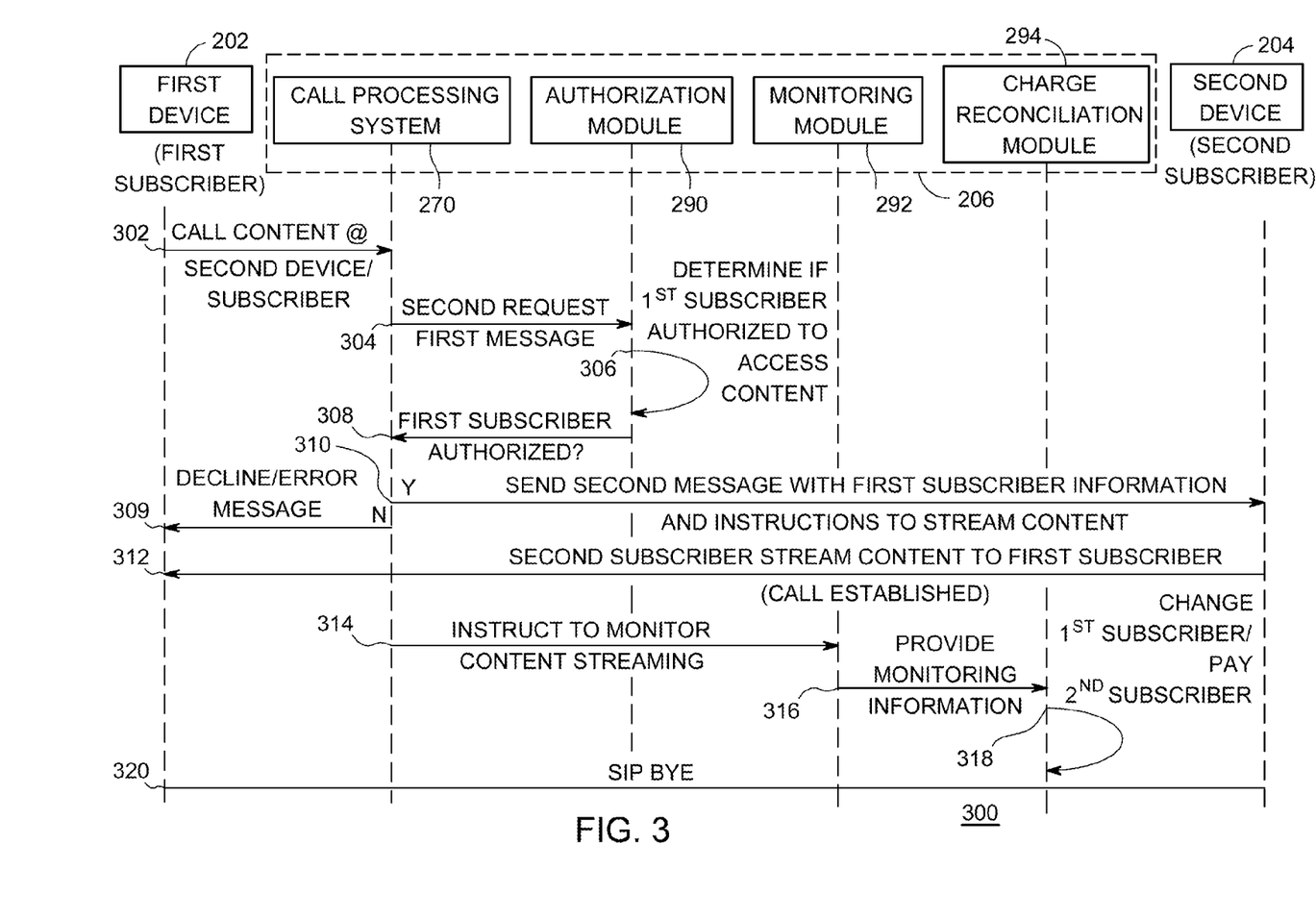
FIG. 3 depicts a flow diagram of a method for enabling delivery of media content, according to one or more embodiments.

Referring to FIG. 3, a method 300 for enabling delivery of media content in accordance with embodiments presented herein begins at 302 where a first subscriber attempts to establish a call with a content provider. In some embodiments, the content request may be originated by a telecommunication device such as, for example, the user device 202 of FIG. 2. The request may be one or more of a voice call, a video call, or a text message, generally referred to as the first message. In attempting to establish the call with the content provider, the call request (i.e., the first message) is sent to call processing system 270 to be processed. In a VoIP network, the call request oftentimes takes the form of a Session Initiation Protocol (SIP) INVITE message sent from the user device 202 to the call processing system 270. However, according to some embodiments, the content request is in form of a text message (e.g., an SMS message), sent to the call processing system 270.

The call processing system 270 processes the first message and identifies/extracts one or more of the following: the content requested, the first subscriber identity, the content provider identity, the user device on which the content is to be streamed, an application that is to be invoked at the user device for displaying the content, a time for streaming the content, and the like. After the call processing system 270 processes the first message, the call processing system 270 may send information extracted from the first message to the authorization module 272 at 304.

At 306, the authorization module 272 determines if the first subscriber is authorized to access the requested content. In some embodiments, the authorization module 272 may obtain information about the first subscriber from the subscriber database 208 and compare the subscriber information obtained with the content properties of the content requested. In some embodiments, the first subscriber is authorized to access the content if one or more conditions are met. Those conditions may include, but are not limited to, the age of the first subscriber meets a minimum age required to view the content, a location of the first subscriber matches the locations allowed to access the content, location of the user device matches the locations allowed to access the content, that the account balance of the first subscriber exceeds the amount required to access the content, and the like. If one or more of the conditions are not met, the first subscriber is not authorized to access the requested content. At 308, the authorization module 290 sends a message to the call processing system 270 indicating whether or not the first subscriber is authorized to access the content.

If the first subscriber is not authorized to access the content, at 309, the call processing system 270 sends an indication to the user device 202 declining access to the requested content. In some embodiments, the indication includes a reason for declining the request, e.g., age restriction, insufficient account balance, content not allowed access at a particular location(s), among others. If however, the first subscriber is authorized to access the content, at 310, the call processing system 270 sends a second message to the content server device 204. The second message includes information identifying the first subscriber or a device associated with the first subscriber (e.g., user device 202) and instructions to stream content to the first subscriber's device. In some embodiments, the second message includes an indication that the first subscriber is authorized to access the content. In VoIP networks, the second message may be a SIP INVITE message.

At 312, the content server device 204, associated with the content provider, "answers the call" such that a communication session is established between the user device 202 and the content server device 204. In some embodiments, the communication session is a real time communication session between the user device 202 and the content server device 204, utilizing one or more from a real-time transport protocol (RTP) session, a HTTP session, or a FTP session.

In some embodiments, establishing the telecommunication session between the user device 202 and the content server device 204 includes sending a first acknowledgement/call acceptance message in response to the forwarded call from the call processing system 270 to the content server device 204 to establish the call between the user device 202 and the content server device 204. In some embodiments, the first acknowledgement/call acceptance message may include information in the header or the body of the message to inform the user device 202 that the call is being established with the content server device 204. For example, in a VoIP system, the first acknowledgement/call acceptance message may be a SIP 200 OK message. The SIP 200 OK message may include a custom SIP header indicating that the call is being established with, or was otherwise forwarded to, the content server device 204. In other embodiments, an existing field in the SIP message header or body may be used to convey that the call is being established with, or was otherwise forwarded to, the content server device 204. In some embodiments, the telecommunication session established may be a real time transfer protocol (RTP) stream between telecommunication module 230 disposed on the user device 202 and the telecommunication module 258 disposed on the content server device 204. Each of the telecommunication modules 230, 258 may individually be a mobile Internet protocol (IP) app, or other type of over-the-top (OTT) communications app, disposed on the respective devices 202, 204.

At 314, the call processing system 270 instructs the monitoring module 292 to monitor the communication session established between the user device 202 and the content server device 204 at 312. Monitoring includes obtaining usage information of the content streamed from the content server device 204 to the user device 202 for display. The usage information includes one or more of an data usage amount (e.g., number of bytes of data transferred), an amount of time that the content 260 is displayed on the user device 202, the number of times the content 260 is accessed or played on the user device 202, the number of views (for pay-per-view type usage determination) of portions of the content 260 on the user device 202, user operations while the content 260 is displayed on the user device 202, e.g., pause, slow motion, fast forward, rewind and the like, forwarding the content identifier to another subscriber, among several other content usage related information.

At 316, the monitoring module 292 sends the usage information to the reconciliation module 294 for calculating charges as applicable to the first subscriber for accessing the content, and for calculating payments as applicable to the content provider for streaming the content to the first subscriber. At 318, the reconciliation module 294 may charge/debit, automatically, an account associated with the first subscriber, for example the first subscriber account 212. In addition, the reconciliation module 294 may credit, automatically, an account associated with the content service provider, for example, the second subscriber account 214 of FIG. 2. Steps 316, 318 could be performed while the communication session is established between the user device 202 and the content server device 204, or after the communication session between the user device 202 and the content server device 204 has been concluded. For example, the communication session between the user device 202 and the content server device 204 may be concluded at 320, for example, in response to the first subscriber concluding the session, for example, by a signal/message that includes a special reason header (e.g., a SIP BYE message), or a voice command that is processed by speech recognition modules included in telecommunication module 230 of the user device 202.

Figure 4:
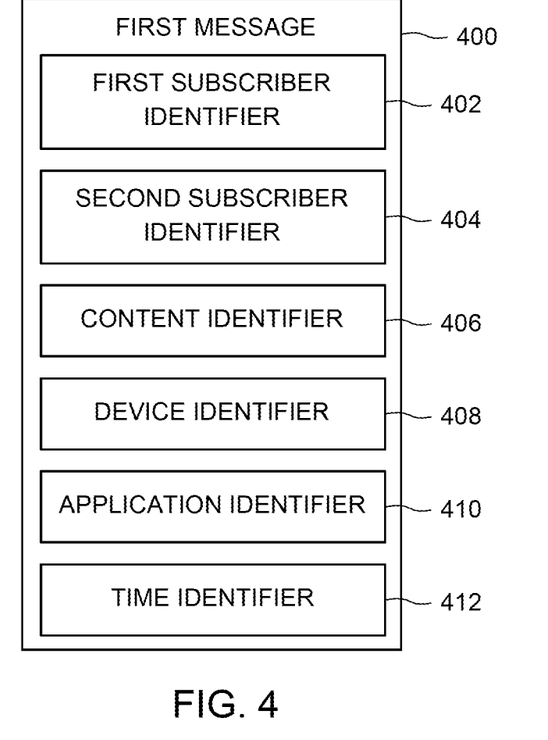
FIG. 4 depicts a block diagram representing a first message received from a first subscriber for enabling delivery of media content, according to one or more embodiments.

FIG. 4 depicts a block diagram representing a first message 400 received from a first subscriber for enabling delivery of media content, in accordance with some embodiments. The first message 400 may include a first subscriber identifier 402 and a second subscriber identifier 404, to uniquely identify the first subscriber and the content provider. In some embodiments, the first subscriber identifier 402 may be a telephone number associated with the first subscriber, and the second subscriber identifier 404 may be a telephone number associated with the content provider. The first message 400 may further include a content identifier 406 to uniquely identify the content. In some embodiments, the content identifier 406 comprises a phone number uniquely identifying the content provider and an alphanumeric code for uniquely identifying the content. In some embodiments, the content identifier 406 is an extension number for dialing or appending to the second subscriber identifier 404 to directly access the content desired. In some embodiments, the content identifier 406 may be a telephone number directly and uniquely identifying the content, and in such cases, the second subscriber identifier 404 may not be required as a part of the first message 400, because the content is linked to a unique content provider, and the content provider can be identified by identifying the content. According to some embodiments, the content identifier 406 further includes multiple content provider identifiers corresponding to multiple content providers. The service provider 206 identifies a second subscriber from the multiple second subscribers for providing the requested content based on several consideration factors, including but not limited to, cost, best data transmission speed, transmission quality, and location of the user device.

The first message 400 optionally includes a device identifier 408 for uniquely identifying a device on which the first subscriber has requested to stream the content. For example, in some cases the first subscriber may use the user device 202 to both request and access/view the content. However, in other cases, the first subscriber may request the content from a device different than the user device 202. For example, in such instances, the first message may include a device identifier 408 uniquely identifying the user device 202. For example, the device identifier 408 may include a MAC address of the device that the content is to be streamed to.

In some embodiments, the first message 400 may optionally include an application identifier 410 to uniquely identify an application for accessing the streamed content. For example, in cases where the first subscriber wishes to access the content using an application other than telecommunication module 230 (i.e., the default application for viewing the content), the first subscriber may select an application on the user device 202 for accessing the streamed content. The application identifier 410 may include unique application identifier, for example. In such examples, the call processing system 270 or the content server device 204 instructs the user device 202 to launch the desired application for displaying the content. The first message 400 optionally includes a time identifier 412 to identify a time different than the current time, at which the first subscriber wishes to stream the content.

Figure 5:
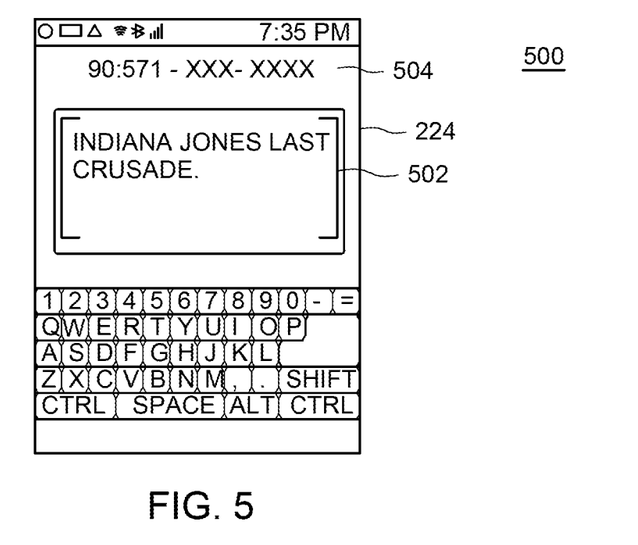
FIG. 5 depicts a graphical user interface of a telecommunication application for enabling delivery of media content, according to one or more embodiments.

Referring to FIG. 5, an exemplary user interface 500 for telecommunication module 230 is shown on display 224 of the user device 202, in accordance with some embodiments of the present invention. In the example shown in FIG. 5, the first subscriber has attempted to request content (e.g., the content 260 from the content server device 204 describer above) by sending the first message as a text message 502. That is, the text message 502 is the first message and is sent to a second subscriber identifier, for example, a unique phone number 504 associated with either the requested content, or the content provider. The call processing system 270 processes the text message to identify/extract the requested content. The call processing system 270 may additionally identify one or more of the devices on which the requested content to be streamed, an application to display the streamed content, a time at which the content must be streamed, and similar other content streaming or display preferences. In the illustrated example, the text string "INDIANA JONES LAST CRUSADE" is identified as the movie "INDIANA JONES AND THE LAST CRUSADE" (content identifier). The text message may be parsed to interpret these instructions from the first subscriber. Additionally, the call processing system 270 identifies header information of the text message to extract information such as the first subscriber identifier, among other information. In some embodiments, the call processing system 270 may query the user device 202 to obtain the device identifier or the application identifier.

The call processing system 270 processes the first message, which may arrive in form of a SMS or another form of text message (e.g., MMS message), and generates a message to send to the authorization module 290 for authorization. Upon authorization of the first subscriber for accessing the requested content, the call processing system 270 generates a second message, e.g., a SIP INVITE message, according to the information in the first message, for being sent to the content server device 204 for establishing a real time communication session between the content server device 204 and the user device 202.

In the embodiments discussed, the first and the second subscribers have been discussed with respect to corresponding user and content server devices, however, in some embodiments, each subscriber may have multiple associated devices, and for example, the first subscriber can send a request from a supplementary device (associated with the first subscriber) to stream to content to the user device. Further, in some embodiments, a third subscriber can request, from a supplementary device associated with the third subscriber, content to be displayed on one of first subscriber's devices (e.g. the user device 202). In such embodiments, authorization of the first subscriber is determined with respect to the content age settings, and authorization of the third subscriber determined with respect to the account balance of the third subscriber and the price of the content, and only of both authorizations are successful, is the content streamed to the user device.

Further, in some embodiments, the first message is sent to the call processing system of the service provider, and the call processing system interprets the first message, and automatically identifies a second subscriber for providing the content. In some embodiments, the first subscriber and the second subscriber are subscribed to different IP telephony service providers, which are communicably coupled and provide connectivity between the first subscriber and the second subscriber for delivery of media content. In such embodiments, call processing systems of each of the two IP telephony systems communicate with each other to establish a call between the user device and content server device, for example. While various embodiments have been described using SIP based VoIP techniques, the embodiments are not restricted to the use of SIP. According to some embodiments, Inter-Asterisk Exchange (IAX) protocol is used for delivering media content.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java, RTM, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 6:
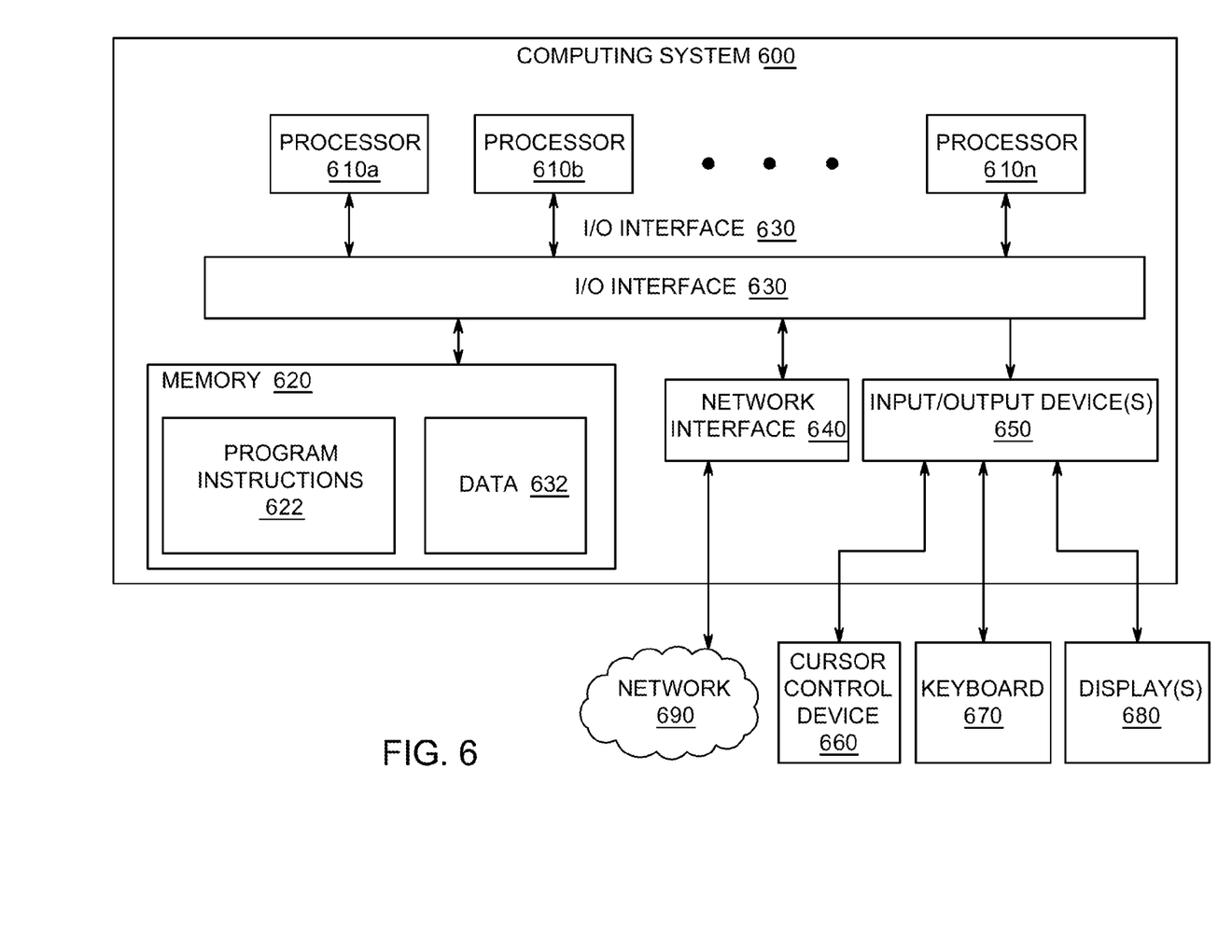
FIG. 6 depicts a computer system that can be utilized in various embodiments of the present invention, according to one or more embodiments.

FIG. 6 depicts a computer system 600 that can be utilized in various embodiments of the present invention to implement the computer and/or the display, according to one or more embodiments.

Various embodiments of method and apparatus for routing calls based upon internal network conditions and/or external carrier network information, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement methods described above. The computer system 600 may be used to implement any other system, device, element, functionality or method of the above-described embodiments. In the illustrated embodiments, computer system 600 may be configured to implement methods 300 as processor-executable executable program instructions 622 (e.g., program instructions executable by processor(s) 610) in various embodiments.

In the illustrated embodiment, computer system 600 includes one or more processors 610a-610n coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of the components may be utilized by the system to receive user input described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), non-volatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated in FIGS. 3A, 3B and 5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for enabling delivery of media content for a first subscriber already registered with a telephony service provider, comprising:
receiving, at a call processing system, a first message from a user device associated with the first subscriber of the telephony service provider to a second subscriber identifier associated with a content service, to establish a real time communication session with the content service after registration with the telephony service provider, wherein the first message includes a first subscriber identifier and information identifying the content to be streamed;

determining that the first subscriber is authorized to access the content;

sending, subsequently after receiving the first message, from the call processing system, a second message directed to the second subscriber identifier associated with the content service to establish the real time communication session between the user device and the content service; and establishing the real time communication session between the user device and the content service via the call processing system to begin streaming the content, wherein the information identifying the content comprises a phone number uniquely identifying the content service and at least one alphanumeric code for uniquely identifying the content.

2. The method of claim 1, wherein the first message is one of a session initiation protocol (SIP) message, a short message service (SMS) message, a Multimedia Messaging Services (MMS), or a telephone call signaling message.

3. The method of claim 1, wherein the first message is further includes the second subscriber identifier.

4. The method of claim 1, wherein determining that the first subscriber is authorized to access the content is based on at least one of the first subscriber identifier or the information identifying the content.

5. The method of claim 1, wherein the first message received from the user device is a SIP INVITE message to establish a VoIP communication session with the content service.

6. The method of claim 1, wherein the second message is responsive to determining that the first subscriber is authorized to access the content.

7. The method of claim 1, wherein determining that the first subscriber is authorized to access the content is based on at least one of the age of the first subscriber, location of the first subscriber, location of the user device, a content display preference of the first subscriber, or an account balance of the first subscriber.

8. The method of claim 1, wherein determining that the first subscriber is authorized to access the content is based on information associated with the content, and wherein the information associated with the content comprises content at least one of an age appropriate rating of the content, location appropriateness of the content, or data size of the content.

9. The method of claim 1, further comprising establishing the real time communication session between the user device and the content service to stream content from the content service to the user device.

10. The method of claim 9, wherein the real time communication session is a real-time transport protocol (RTP) session.

11. The method of claim 1, further comprising monitoring the content that is streamed from the content service to the user device.

12. The method of claim 11, further comprising charging a pre-existing account of the first subscriber with the telephony service provider for streaming the content on the user device.

13. The method of claim 12, wherein the first subscriber is charged according to at least one of a pay-per view charge, or a fixed charge.

14. The method of claim 11, further comprising crediting a pre-existing account associated with the content service for streaming the content to the user device.

15. The method of claim 1, wherein the information identifying the content comprises a phone number uniquely identifying the content, the phone number associated with at least one of an Internet protocol (IP) telephony system, a PSTN network, or a cellular phone network.

16. The method of claim 1, wherein the first message further comprises a device identifier that uniquely identifies the user device, wherein the content is to be streamed to the user device.

17. The method of claim 1, wherein the first message further comprises an application identifier that uniquely identifies an application on the user device for displaying the streamed content.

18. The method of claim 1, wherein the second message is a SIP message.

19. A system for enabling delivery of media content for a first subscriber already registered with a telephony service provider, comprising:

a call processing system comprising;

one or more processors; and a memory coupled to the one or more processors, wherein the memory stores thereon computer instructions that when executed, are configured to:

receive a first message from a user device associated with the first subscriber of the telephony service provider to a second subscriber identifier associated with a content service, to establish a real time communication session with the content service after registration with the telephony service provider, wherein the first message includes a first subscriber identifier and information identifying the content to be streamed;

determine that the first subscriber is authorized to access the content;

send, subsequently after receiving the first message, a second message directed to the second subscriber identifier associated with the content service to establish the real time communication session between the user device and the content service; and establishing the real time communication session between the user device and the content service via the call processing system to begin streaming the content, wherein the information identifying the content comprises a phone number uniquely identifying the content service and at least one alphanumeric code for uniquely identifying the content.

20. The system of claim 19, further comprising an authorization module configured to determine whether the first subscriber is authorized to access the content.

21. The system of claim 20, wherein the call processing system is configured to send the second message responsive to the authorization module determining that the first subscriber is authorized to access the content.

22. The system of claim 20, wherein the authorization module is configured to determine whether the first subscriber is authorized to access the content based on at least one of the first subscriber identifier or the information identifying the content.

23. The system of claim 19, wherein the first message is one of a session initiation protocol (SIP) message, a short message service (SMS) message, a Multimedia Messaging Services (MMS), or a telephone call signaling message.

24. The system of claim 19, wherein the first message is a SIP INVITE message to establish a VoIP communication session with the content service.

25. The system of claim 19, further comprising a monitoring module configured to monitor the content streaming from the content service to the user device.

26. The system of claim 25, further comprising a charge reconciliation module configured to charge a pre-existing account of the first subscriber with the telephony service provider for streaming the content on the user device.

27. The system of claim 26, wherein the charge reconciliation module is configured to charge the first subscriber based on information received from the monitoring module regarding the content streaming.

28. The system of claim 26, wherein the charge reconciliation module is configured to credit a pre-existing account associated with the content service for streaming the content to the user device.

\* \* \* \* \*